Nov. 1, 1938.  H. BECKER  2,135,026
MOVING PICTURE CAMERA
Filed Sept. 16, 1936
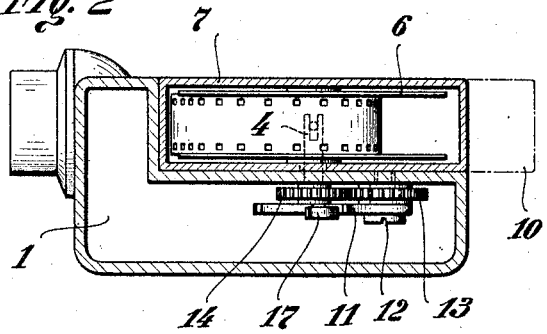
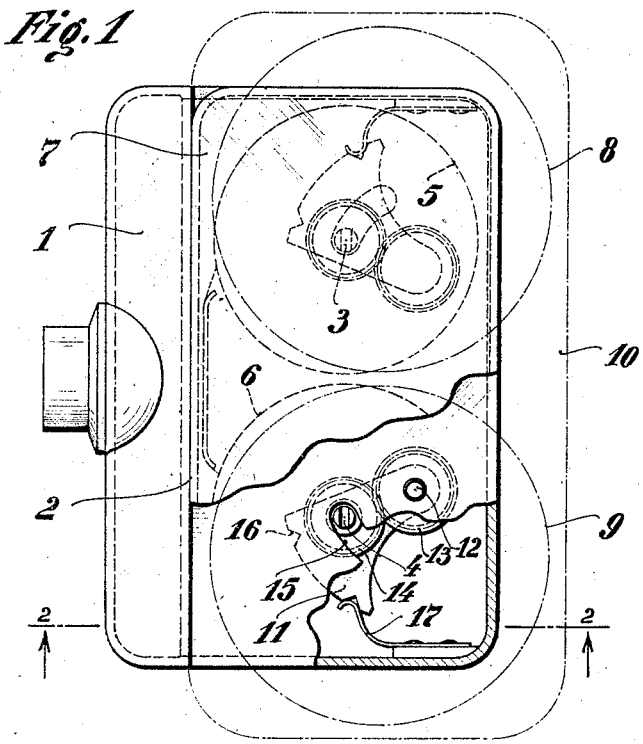
Helmut Becker
INVENTOR
BY Ivan E. C. Konigsberg
ATTORNEY Patented Nov. 1, 1938

2,135,026

UNITED STATES PATENT OFFICE 2,135,026

MOVING PICTURE CAMERA

Helmut Becker, Wetzlar, Germany, assignor to Ernst Leitz, G. m. b. H., Wetzlar, Germany Application September 16, 1936, Serial No. 101,032 In Germany October 10, 1935

2 Claims. (Cl. 242—55)

This invention relates to improvements in motion picture cameras and has particular reference to a novel mechanism for supporting and adjusting the shafts which receive and operate the film reels contained in a film reel casette which is attached to the camera.

The object of the invention is to provide means for adjusting the film reel shafts in the camera so that a film casette larger than the casette space provided in the camera may be attached to the outside of the camera with the film reels fitted upon the film reel shafts. In a larger film reel casette the distance between the centers of the film reels is obviously greater than the distance between the centers of smaller film reels within a smaller casette. The object of the invention is therefore to arrange the film reel shafts in the camera in such a manner that film casettes of different capacities may be used with the same camera. Accordingly the invention is embodied in a moving picture camera arranged as hereinafter set forth and as illustrated in the accompanying drawing in which Fig. 1 is a plan view illustrating the invention with details omitted.

Fig. 2 is a sectional view on line 2—2 of Figure 1.

In the drawing the moving picture camera 1 has an upstanding wall 2 against which the film casette is placed and attached in a well known manner. The camera is provided with two film reel receiving shafts 3 and 4. These shafts are made adjustable to receive either the reels 5 and 6 in the smaller casette 7 or the larger reels 8 and 9 in the larger casette 10 which is shown in dotted lines. Each of the shafts 3 and 4 is carried by a sector 11 which is pivoted upon a shaft 12. This shaft carries a gear 13 for driving the gear 14 upon the reel shaft to operate the film from one reel to another and vice versa in a well known manner. The shaft 3 and 4 projects through slots 15 in the camera casing.

Each sector is provided with a plurality of notches 16 for holding the sectors and the shafts in operative positions by means of springs 17 engaging the notches in an obvious manner.

When the smaller casette 7 is used, then the shafts 3 and 4 are positioned to receive the smaller reels 5 and 6. If the larger casette is used then the shafts 3 and 4 are moved outwardly into positions to receive the reels 8 and 9. The reel receiving shafts of the camera are thus adjustable to receive reels from casettes of different sizes in which the distance between the reel centers are correspondingly different.

In cameras, in which the film moves in only one direction, only one adjustable reel receiving shaft is used because the location of the other shaft is fixed. In such case only one of such shafts, for instance the shaft 4, is made adjustable.

The invention provides a very simple mechanism for spacing the reel receiving shafts of a moving picture camera to correspond with the positions of the hollow shafts of the film reels in the casettes.

I claim:—

1. In a motion picture camera, a pair of spaced film reels operating shafts, mechanism for adjustably positioning said shafts in one of several predetermined positions to receive and operate film reels of different film carrying capacities, means automatically operable to maintain the said shafts in any one of the said positions and means for driving the said shafts.

2. In a motion picture camera, a film reel operating shaft projecting through a slot in said camera, a pivoted swingable sector supporting said shaft, notches in said sector and a spring engaging any one of said notches to maintain the said sector and shaft in any one of several predetermined positions.

HELMUT BECKER.